United States Patent

[11] 3,607,904

| [72] | Inventors | Jozef Frans Willems<br>Wilrijk;<br>Frans Clement Heugebaert, Kontich, both of Belgium |
|---|---|---|
| [21] | Appl. No. | 727,665 |
| [22] | Filed | May 8, 1968 |
| [45] | Patented | Sept. 21, 1971 |
| [73] | Assignee | Gevaert-Agfa N.V.<br>Mortsel, Antwerp, Belgium |
| [32] | Priority | May 8, 1967 |
| [33] | | Great Britain |
| [31] | | 21250/67 |

[54] SULPHONATED S-ALKYL AND S-ARALKYL THIOSULPHATES
6 Claims, No Drawings

[52] U.S. Cl. .................................................. 260/453, 252/62.1, 260/327
[51] Int. Cl. ....................................................C07c 139/00, C07c 141/00
[50] Field of Search........................................... 260/453, 327

[56] References Cited
UNITED STATES PATENTS

| 1,786,611 | 12/1930 | Harden.......................... | 260/327 |
| 2,799,702 | 7/1957 | Gaertner........................ | 260/327 |
| 2,850,507 | 9/1958 | Gaertner........................ | 260/327 |
| 2,875,125 | 2/1959 | Gaertner........................ | 260/327 |
| 2,914,547 | 11/1959 | Gaertner........................ | 260/327 |
| 3,153,077 | 10/1964 | Tesoro .......................... | 260/453 |
| 3,301,884 | 1/1967 | Meininger et al.............. | 260/453 |
| 3,408,381 | 10/1968 | Westland....................... | 260/453 |

FOREIGN PATENTS

| 997,031 | 6/1965 | Great Britain................ | 260/453 |
| 550,854 | 11/1956 | Italy .............................. | 260/327 |

*Primary Examiner*—Lewis Gotts
*Assistant Examiner*—G. Hollrah
*Attorney*—Alfred W. Breiner

ABSTRACT:
A process of preparing an S-alkyl or S-aralkyl thiosulphate compound having the formula:

$$MO_3S-L_1-L_2-L_3-S-SO_3M$$

comprising the steps of mixing an intramolecular ester having the formula:

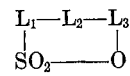

with an aqueous solution containing an inorganic thiosulphate and heating the mixture, wherein each of $L_1$ and $L_3$ stands for a methylene group, and
$L_2$ stands for an alkylene group comprising from 1 to 3 carbon atoms in straight line, or $L_1$ together with $L_2$ stands for the group 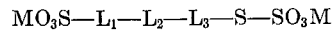

wherein Z represents the atoms necessary to close an aromatic nucleus, and
M stands for a metal atom such as an alkali metal atom or an ammonium group, is described. The compounds are useful in photographic silver halide emulsions.

SULPHONATED S-ALKYL AND S-ARALKYL THIOSULPHATES

The present invention relates to new compounds, more particularly to new so-called Bunte salts and to the preparation thereof.

Bunte salts are interesting intermediate compounds for use in organic syntheses. They can be used for instance for the preparation of the corresponding thiols by hydrolysis in acid medium, for the preparation of mercaptals by reaction in acid medium with aldehydes as described e.g. in J.A.C.S. 63, 658—659(1941) and for the preparation of aliphatic disulfides as described e.g. in J.A.C.S. 64, 149—150(1942).

In accordance with the present invention a method has been found to prepare sulfonated Bunte salts more particularly sulfonated S-alkyl and S-aralkyl thiosulfates which method comprises allowing to react the appropriate sultones i.e. intramolecular esters of the corresponding hydroxy sulfonic acids with inorganic thiosulfates more particularly alkali thiosulfates or ammonium thiosulfate.

The invention therefore includes as new compounds sulfonated S-alkyl and S-aralkyl thiosulfates as well as a method for preparing them.

More particularly, the invention includes as new compounds Bunte salts corresponding to the following general formula:

$$MO_3S-L_1-L_2-L_3-S-SO_3M$$

wherein:

$L_1$ represents a methylene group including a substituted methylene group e.g. alkyl and aryl substituted methylene or $L_1$ together with $L_2$ stands for the group

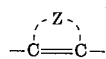

wherein Z represents the atoms necessary to close an aromatic nucleus including a substituted aromatic nucleus, $L_2$ represents an alkylene group including a substituted alkylene group such as alkyl and aryl substituted alkylene said alkylene group comprising from 1 to 3 carbon atoms or $L_2$ together with $L_1$ stands for the group

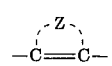

wherein Z has the significance given above, and $L_3$ represents a methylene group including a substituted methylene group e.g. alkyl and aryl substituted methylene, and M stands for a metal atom such as an alkali metal atom or an ammonium group.

As will be illustrated hereinafter the sulfonated Bunte salts of the invention are more particularly prepared by addition of the corresponding sultone, occasionally from a solution in a water-miscible solvent such as dioxan, alcohol, acetone, etc. to an aqueous solution of the thiosulfate, followed, if necessary, by heating.

For instance 1- sulfopropyl thiosulphate disodium salt was prepared by addition of 1.05 mole of 1-propanesulfonic acid 3-hydroxy sultone, at room temperature and while stirring thoroughly, to a solution of 1 mole of sodium thiosulfate in 5000 ml. of water. The reaction has come to an end when 1 drop of N/10 iodine does not discolor any more in 1 ml. of reaction mixture.

The sulfonated Bunte salt formed was precipitated from the aqueous solution by pouring the solution into an appropriate solvent such as ethanol. The precipitate was filtered off and washed by means of the solvent employed for precipitation. Yield: 90 percent.

In the same way as 1-sulfopropyl thiosulfate disodium salt were prepared: sulfobutyl thiosulfate disodium salt (Yield: 86 percent - solvent: ethanol), 2-sulpho-2, 4-dimethylbutyl thiosulfate disodium salt (Yield: 70 percent -solvent: ethanol) and o-sulfobenzyl thiosulfate disodium salt (Yield: 70 percent - solvent: dioxan/acetone).

The sultones can be prepared for instance as described by J. Willems, Bull. Soc. Chim. Belg. 64, 747—71(1955) by distillation in the presence of a suitable diluent of the corresponding hydroxysulfonic acids which in their turn can be prepared as described by the same author in Bull. Soc. Chim. Belg. 64, 409—44 1955) by reaction of a bisulfite with an unsaturated alcohol with terminal double bond, by reduction of carbonylsulfonic acids or by oxidation of hydroxy-alkyl mercaptans.

Particularly suitable sultones for use in the preparation of the Bunte salts according to the invention by reaction with a thiosulfate can be represented by the formula:

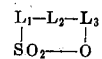

wherein $L_1$, $L_2$ and $L_3$ have the significances given above.

The following is a nonlimitative list of representative sultones suitable for use in the method of the invention: 1-propanesulfonic acid, 3-hydroxy sultone

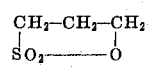

1- butanesulfonic acid, 4-hydroxy sultone

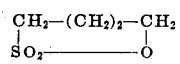

1-pentanesulfonic acid, 5-hydroxy sultone

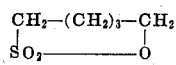

1-butanesulfonic acid, 3-hydroxy sultone

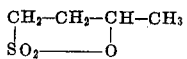

2 butanesulfonic acid, 4-hydroxy sultone

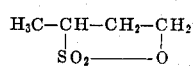

2-pentanesulfonic acid, 4-hydroxy sultone

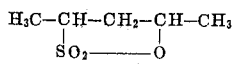

2-methyl 12- pentanesulfonic acid, 4-hydroxy sultone

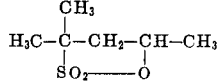

4- heptanesulfonic acid, 2-hydroxy sultone

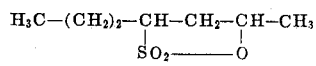

1- heptanesulfonic acid, 3-hydroxy sultone

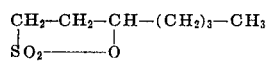

6-methyl-1- heptanesulfonic acid, 3- hydroxy sultone

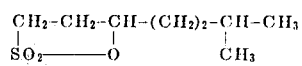

3-methyl-4-heptanesulfonic acid, 2-hydroxy sultone

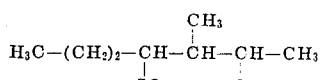

4-decanesulfonic acid, 2-hydroxy sultone

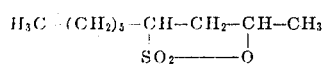

3-methyl-4-decanesulfonic acid, 2-hydroxy sultone

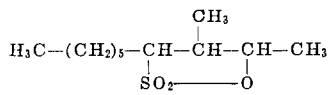

1- -henedcanesulfonic acid, 3-hydroxy sultone

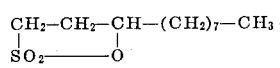

4octadecanesulfonic acid, 2-hydroxy sultone

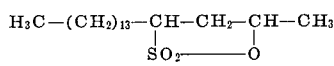

1- phenyl-1-butanesulfonic acid, 3-hydroxy sultone

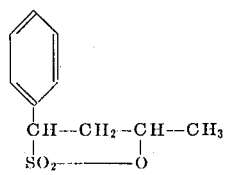

o-toluenesulfonic acid, α -hydroxy sultone

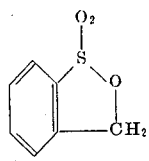

The sulfonated Bunte salts according to the present invention are valuable starting products for the synthesis of several organic compounds amongst which thiols, mercaptals and disulfides. In this connection there can for instance be referred to Jl. Am. Chem. Soc. 63, 658–659(1941) and 64, 149–1501942). The compounds prepared from the Bunte salts of the invention are characterized by the presence of a sulfo group i.e. a water-solubilizing group which is otherwise not easily introduced in the said compounds. For instance with the Bunte salts of the invention sulfonated mercapto compounds can be prepared by simple hydrolysis in acid medium which mercapto compounds have interesting properties for use in photography more particularly as stabilizing agents for silver halide emulsions. In this connection there can for instance be referred to 2-mercapto-4sulfu-octadecane, prepared from 1-methyl-4-sulfoheptadecyl thiosulfate by acid hydrolysis, which is an interesting compound for preventing the formation of yellow fog in light-sensitive silver halide material as described in United Kingdom Patent Application 7252/67.

Further, the sulfonated Bunte salts according to the invention can be used as agents for protection against radiation. They can also be used as such in photography, e.g. as complexing agent for silver halide and as chemical sensitizers as described in United Kingdom Patent Specification 997,031.

The compounds being easily hydrolyzed in acid medium are particularly suitable as is illustrated in the example hereinafter for use in so-called stabilization processing i.e., in methods for stabilizing developed photographic materials as agents preventing fading of the silver image. As a matter of face, by treatment of the photographic material with the stabilizing bath which is of acid nature the corresponding mercapto compound is set free. The sulfonated Bunte salts of the invention therefore can be regarded as latent mercapto compounds which offer the advantage of giving no rise to desensitization when present in the silver halide material owing to the fact that the mercapto group is released only upon processing.

EXAMPLE

A gelatino silver chlorobromide emulsion (60mole percent silver bromide and 40mole percent silver iodide) comprising in addition to hydroquinone, potassium metabisulfite and other common emulsion ingredients such as sensitizing agents, hardening agents, and coating aids; 1 g. of 1-sulphopropyl thiosulfate disodium salt per mole of silver halide is coated on a conventional baryta-coated paper support and dried.

The material obtained is exposed and developed e.g. in a developing bath comprising per liter 60g. of sodium hydroxide, 40 g. of anhydrous sodium sulfite, 2 g. of potassium bromide and 1g. of 1-phenyl-3-pyrazolidinone.

The exposed and developed material is treated in a stabilizing bath having the following composition:

| | |
|---|---|
| ammonium thiocyanate | 250g. |
| potassium metabisulfate | 145g. |
| 30% formaldehyde | 120ml. |
| 60% acetic acid | 25ml. |
| water to make | 1,000ml. |

After having been dried, the image obtained shows, as compared with an image obtained with a silver halide material comprising no such sulfonated alkyl thiosulfate, good stability against fading of the image silver and staining of the highlight areas on storing.

We claim:

1. A process of preparing an S-alkyl or S-aralkyl thiosulfate compound having the formula:

$$MO_3S-L_1-L_2-L_3-S-SO_3M$$

comprising the steps of mixing an intramolecular ester having the formula:

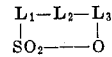

with an aqueous solution containing approximately stioichiometric amounts of alkali metal or ammonium thiosulfate and heating the mixture at a temperature sufficient to form said compound, wherein
   each of $L_1$ and $L_3$ stands for a methylene group and
   $L_2$ stands for a alkylene group comprising from 1 to 3 carbon atoms in straight line, or
   $L_1$ together with $L_2$ stands for the group

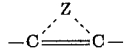

wherein Z represents the atoms necessary to close a hydrocarbon aromatic nucleus, and
   M stands for an alkali metal atom or an ammonium group.

2. The process of claim 1 wherein the said process is carried out in the presence of an organic water-miscible solvent of the said intramolecular ester.

3. The process of claim 1 including the step of separating the S-alkyl or S-aralkyl thiosulfates by precipitation in an organic solvent.

4. The process of claim 1 wherein each of $L_1$ and $L_3$ stands for methylene and $L_2$ stands for an alkylene group comprising from 1 to 3 carbon atoms in a straight line.

5. An S-alkyl or S-aralkyl thiosulfate compound which corresponds to the formula:

$$MO_3S-L_1-L_3-S-SO_3M$$

wherein M stands for an alkali metal atom or ammonium group,
   each of $L_1$ and $L_3$ stands for a methylene group, and
   $L_2$ stands for an alkylene group comprising from 1 to 3 carbon atoms in a straight line,
   or $L_1$ together with $_2$ stands for the group

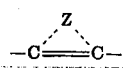
wherein Z represents the atoms necessary to close a hydrocarbon aromatic nucleus.
6. The compound of claim 5 wherein each of $L_1$ and $L_3$ stands for methylene and $L_2$ stands for an alkylene group comprising from 1 to 3 carbon atoms in a straight line.